United States Patent
Francisco et al.

(10) Patent No.: US 9,204,780 B2
(45) Date of Patent: Dec. 8, 2015

(54) SIPHON BREAK APPARATUS CONFIGURED TO SUBSTANTIALLY PREVENT A SIPHON EFFECT IN A FLUID CONDUIT OF A DISHWASHER AND AN ASSOCIATED METHOD

(75) Inventors: Virgil J. Francisco, Ayden, NC (US); Mark D. Montgomery, Greenville, NC (US); Ralph A. Porcaro, II, Clayton, NC (US)

(73) Assignee: Electrolux Home Products, Inc., Charlotte, NC (US)

( * ) Notice: Subject to any disclaimer, the term of this patent is extended or adjusted under 35 U.S.C. 154(b) by 958 days.

(21) Appl. No.: 13/358,576

(22) Filed: Jan. 26, 2012

(65) Prior Publication Data

US 2012/0192904 A1    Aug. 2, 2012

Related U.S. Application Data

(60) Provisional application No. 61/438,438, filed on Feb. 1, 2011.

(51) Int. Cl.
*A47L 15/42* (2006.01)
*E03B 7/07* (2006.01)
*F16K 15/04* (2006.01)
*F16K 17/00* (2006.01)

(52) U.S. Cl.
CPC ............... *A47L 15/4223* (2013.01); *E03B 7/07* (2013.01); *E03B 7/071* (2013.01); *E03B 7/077* (2013.01); *F16K 15/04* (2013.01); *F16K 17/00* (2013.01); *Y10T 29/49826* (2015.01); *Y10T 137/3149* (2015.04)

(58) Field of Classification Search
CPC ....... A47L 15/4223; E03B 7/07; E03B 7/071; E03B 7/077; F16K 15/04; F16K 17/00; Y10T 29/49826; Y10T 137/3149
USPC .............. 134/21, 56 D, 57 D, 58 D, 110, 186
See application file for complete search history.

(56) References Cited

U.S. PATENT DOCUMENTS

| | | | |
|---|---|---|---|
| 3,183,923 A | 5/1965 | Henrikson | |
| 3,346,000 A | 10/1967 | Cushing | |
| 5,016,667 A | 5/1991 | Tolf | |

(Continued)

FOREIGN PATENT DOCUMENTS

| | | |
|---|---|---|
| CH | 679271 A5 | 1/1992 |
| DE | 2 023 299 A1 | 11/1971 |

(Continued)

*Primary Examiner* — Joseph L Perrin
*Assistant Examiner* — Levon J Shahinian
(74) *Attorney, Agent, or Firm* — Alston & Bird LLP

(57) ABSTRACT

According to example embodiments, a dishwasher may include a siphon break apparatus configured to substantially prevent a siphon effect in a fluid conduit configured to drain a fluid from the dishwasher. The siphon break apparatus may include a first check valve in fluid communication with the fluid conduit and exposed to a pressure therein and a second check valve in fluid communication with the first check valve. The first and second check valves may be configured to be substantially closed when pressure in the fluid conduit increases as a result of fluid being pumped through the fluid conduit and substantially open when pressure in the fluid conduit decreases as a result of the fluid no longer being pumped through the fluid conduit. Thereby the siphon effect may be substantially prevented.

24 Claims, 6 Drawing Sheets

(56) References Cited

U.S. PATENT DOCUMENTS

| | | | |
|---|---|---|---|
| 5,199,455 A | 4/1993 | Dlouhy | |
| 5,279,324 A * | 1/1994 | Schutz et al. | 137/48 |
| 5,749,394 A * | 5/1998 | Boehmer et al. | 137/533.15 |
| 6,971,400 B1 | 12/2005 | Bowman et al. | |
| 7,434,587 B2 | 10/2008 | Jeong | |
| 2005/0115592 A1 * | 6/2005 | Lee | 134/57 D |
| 2005/0236019 A1 | 10/2005 | Bang | |
| 2008/0072933 A1 | 3/2008 | Graf et al. | |
| 2008/0271792 A1 | 11/2008 | Jeong | |
| 2008/0283099 A1 | 11/2008 | Peukert et al. | |
| 2009/0056772 A1 | 3/2009 | Lee | |
| 2009/0133719 A1 | 5/2009 | Park | |
| 2011/0155189 A1 | 6/2011 | Ertle et al. | |

FOREIGN PATENT DOCUMENTS

| | | |
|---|---|---|
| DE | 297 22 975 U1 | 2/1998 |
| DE | 203 15 156 U1 | 12/2003 |
| EP | 1 520 926 A1 | 4/2005 |
| EP | 1 543 760 A2 | 6/2005 |
| EP | 2 128 326 A1 | 12/2009 |
| JP | 4-224724 A | 8/1992 |
| JP | 6-046979 A | 2/1994 |
| JP | 10-225416 A | 8/1998 |
| JP | 2004-129772 A | 4/2004 |
| WO | WO 2007/074104 A1 | 7/2007 |

* cited by examiner

SIPHON BREAK APPARATUS CONFIGURED TO SUBSTANTIALLY PREVENT A SIPHON EFFECT IN A FLUID CONDUIT OF A DISHWASHER AND AN ASSOCIATED METHOD

CROSS REFERENCE TO RELATED APPLICATION

The present application claims priority to U.S. Provisional Application No. 61/438,438, entitled "Siphon Break Apparatus Configured To Substantially Prevent A Siphon Effect In A Fluid Conduit Of A Dishwasher And An Associated Method," filed Feb. 1, 2011, the contents of which are hereby incorporated by reference in its entirety.

BACKGROUND

1. Field of the Disclosure

Embodiments of the disclosure are generally directed to siphon prevention apparatuses and, more particularly, to a siphon break apparatus configured to substantially prevent a siphon effect in a fluid conduit configured to drain a fluid from a dishwasher.

2. Description of Related Art

One issue of interest in the field of dishwashers is to allow for proper draining of fluids from the dishwasher. In this regard, during a drain cycle it may be desirable to pump out soiled water from the dishwasher that may include water, detergent, and food matter removed from the dishes. Thus, the dishwasher may include a drain pump that expels the soiled water from the washing chamber through a drain hose. The drain hose may be routed so that the soiled water first travels upwardly and then downwardly out of the dishwasher towards drain plumbing to resist backflow of water into the dishwasher from the plumbing and sewage system connected thereto.

However, as a result of this configuration of the drain hose, a siphon effect may occur. The siphon effect may act by way of atmospheric pressure pushing water up the drain hose into a reduced pressure area at the top of the drain hose. The reduced pressure area is caused by water falling on the exit side of the drain hose leading to the plumbing. The siphon effect may thus cause the undesirable result that water is pulled from the washing cavity through the drain pump and out the drain hose after the drain pump has stopped operating. Thereby, clean water that is intended to remain in the washing chamber and needed to further wash or rinse the dishes may instead be sucked out of the washing chamber by the siphon effect. Conversely, the siphon effect may suck soiled water into the washing chamber from the plumbing side of the drain hose in some instances, which may also be undesirable.

Techniques have been developed to address the siphon effect. For example, a vent hose and a check valve may be employed and/or the drain hose may vent through a sink drain. Accordingly, the siphon effect may not occur because pressure in the drain hose may be relieved by the vent, and water may no longer be drawn out of or into the washing chamber. Check valves may function by opening to allow air to enter the drain hose while substantially preventing water from escaping through the vent hose. However, these solutions may not function properly in some instances. For example, the drain hose or vent hose may be improperly installed, and check valves may leak. Thus, the siphon effect described above may still occur with present dishwasher configurations.

BRIEF SUMMARY

The above and other needs are met by embodiments of the present disclosure which, in one aspect, provides a siphon break apparatus configured to substantially prevent a siphon effect in a fluid conduit configured to drain a fluid. The siphon break apparatus may comprise a first check valve in fluid communication with the fluid conduit and exposed to a pressure therein that fluctuates in response to the fluid flowing through the fluid conduit, and a second check valve in fluid communication with the first check valve. The first check valve and the second check valve may be configured to be substantially closed when the pressure increases as a result of the fluid being pumped through the fluid conduit, and the first check valve and the second check valve may be configured to be substantially open when the pressure decreases as a result of the fluid no longer being pumped through the fluid conduit.

In one aspect the first check valve may be disposed in a substantially open position prior to pumping fluid through the fluid conduit. For example, the first check valve may comprise a ball check valve. The ball check valve may comprise a buoyant ball configured to float in the fluid and seal against an upper sealing surface of the ball check valve when the fluid is pumped through the fluid conduit. Further, the second check valve may be in a closed position prior to pumping fluid through the fluid conduit. For example, the second check valve may comprise a ball check valve. The ball check valve may comprise a non-buoyant ball configured to seal against a lower sealing surface of the ball check valve when the fluid is pumped through the fluid conduit. The non-buoyant ball may comprise a glass marble ball, and the lower sealing surface may comprise an elastomeric material in some embodiments. The ball check valve may further comprise a guide wall configured to guide the non-buoyant ball with respect to the lower sealing surface when the ball check valve opens and closes.

In a further aspect the siphon break apparatus may comprise a reservoir configured to receive any of the fluid that escapes from the fluid conduit through the first check valve. The second check valve may be configured to open as a result of formation of a pressure differential between a reservoir pressure in the reservoir and an atmospheric pressure external to the reservoir. The second check valve may be coupled to the reservoir. For example, the second check valve may be positioned inside the reservoir. In one embodiment, the reservoir is disposed between the first and second check valves. The reservoir may define a substantially airtight enclosure when the second check valve is closed. Further, the reservoir may define a sloping bottom surface that slopes toward the first check valve.

In a further embodiment a dishwasher is provided. The dishwasher may comprise a washing chamber and a fluid supply configured to supply a fluid to the washing chamber. A drain pump may be configured to receive the fluid and pump the fluid through a fluid conduit configured to drain the fluid from the washing chamber. Further, a siphon break apparatus may be coupled to the fluid conduit and configured to substantially prevent a siphon effect in the fluid conduit. The siphon break apparatus may comprise a first check valve in fluid communication with the fluid conduit and exposed to a pressure therein and a second check valve in fluid communication with the first check valve. The first check valve and the second check valve may be configured to be substantially closed when the pressure increases as a result of the fluid being pumped through the fluid conduit. Further, the first check valve and the second check valve may be configured to be substantially open when the pressure decreases as a result of the fluid no longer being pumped through the fluid conduit.

In one aspect the dishwasher may further comprise a vent hose coupled to the second check valve and configured to receive any of the fluid that escapes through the second check valve. Also, the dishwasher may include a base tray configured to receive water directed thereto by the vent hose. The fluid conduit may define an inverted U-shape, and the siphon break apparatus may be coupled to the fluid conduit at a top portion of the inverted U-shape. The dishwasher may further comprise a reservoir configured to receive any of the fluid that escapes from the fluid conduit through the first check valve. In some embodiments the second check valve may be configured to open as a result of formation of a pressure differential between a reservoir pressure in the reservoir and an atmospheric pressure external to the reservoir.

In an additional embodiment a method for assembling a dishwasher is provided. The method may comprise providing a dishwasher. The dishwasher may comprise a washing chamber, a fluid supply configured to supply a fluid to the washing chamber, and a drain pump configured to receive the fluid and pump the fluid through a fluid conduit configured to drain the fluid from the washing chamber. Further, the method may include coupling a siphon break apparatus to the fluid conduit wherein the siphon break is configured to substantially prevent a siphon effect in the fluid conduit. The siphon break apparatus may comprise a first check valve in fluid communication with the fluid conduit and exposed to a pressure therein and a second check valve in fluid communication with the first check valve. The first check valve and the second check valve may be configured to be substantially closed when the pressure increases as a result of the fluid being pumped through the fluid conduit. Further, the first check valve and the second check valve may be configured to be substantially open when the pressure decreases as a result of the fluid no longer being pumped through the fluid conduit. In one aspect the method may further include configuring the fluid conduit to define an inverted U-shape, and coupling the siphon break apparatus to the fluid conduit at a top portion of the inverted U-shape.

As such, aspects of the present disclosure may provide significant advantages as otherwise detailed herein.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION

The present disclosure now will be described more fully hereinafter with reference to the accompanying drawings, in which some, but not all embodiments are shown. Indeed, embodiments may define many different forms and should not be construed as limited to the embodiments set forth herein; rather, these embodiments are provided so that this disclosure will satisfy applicable legal requirements. Like numbers refer to like elements throughout.

Figure 1:
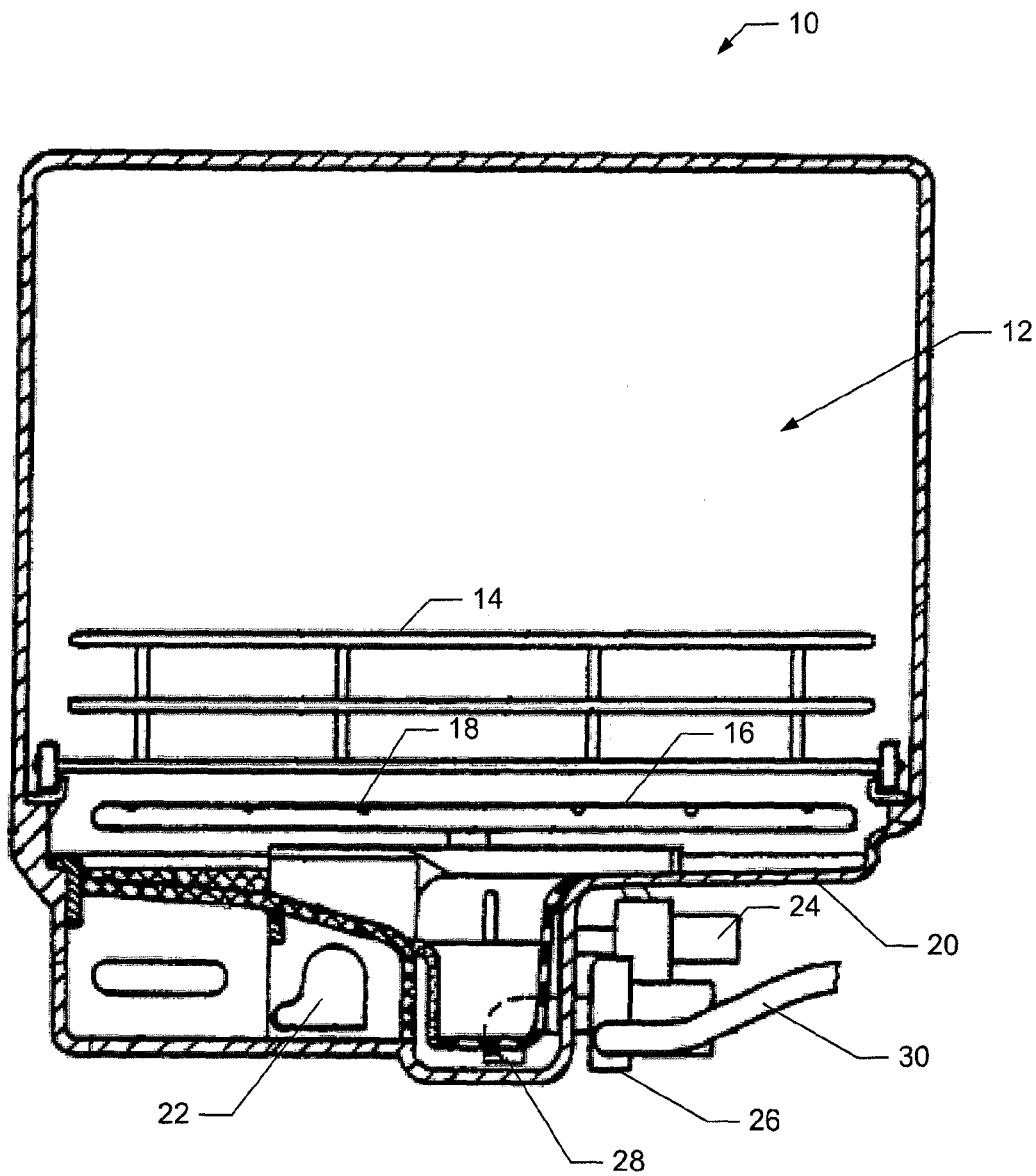
FIG. 1 illustrates one embodiment of a dishwasher comprising a drain hose.

FIG. 1 shows an exemplary embodiment of a dishwasher 10. The dishwasher 10 may comprise a washing chamber 12 in which dishware may be inserted in a dish rack 14. In the washing chamber 12 there may be one or more rotating spray arms 16 that direct circulating dishwashing fluid through spray nozzles 18 towards the dishware that is placed in the dish rack 14. The circulating dishwashing fluid may fall down on a bottom wall 20 of the washing chamber 12 and be directed towards an inlet 22 for a circulation pump 24 for redistribution of the dishwashing fluid to the rotating spray arm 16.

When a washing cycle is complete, the dishwasher 10 may dispose of the soiled water. In this regard, the dishwasher 10 may further comprise a drain pump 26 that is configured to pull the soiled water from the washing chamber 12 through an inlet 28 and discharge the soiled water through a fluid conduit such as the illustrated drain hose 30. The drain hose 30 may lead to plumbing within a home or other structure in which the dishwasher 10 is installed. Accordingly, dishware may be cleaned and the resulting soiled water may be disposed of through a sewage system.

In some embodiments the drain hose 30 may be configured to slope upwardly and then downwardly before connecting to the plumbing so as to resist backflow of soiled water from the plumbing into the dishwasher 10. As described above, this configuration may have the undesirable result of producing a siphon effect that may draw clean water out of the washing chamber 12 or draw soiled water back into the dishwasher. Accordingly, FIGS. 2-6 illustrate an embodiment of a siphon break apparatus 100 that may be configured to substantially prevent the siphon effect in the drain hose 30 of the dishwasher 10 illustrated in FIG. 1, or in various other embodiments of dishwashers and washing appliances as may be understood by one having ordinary skill in the art.

Figure 2:
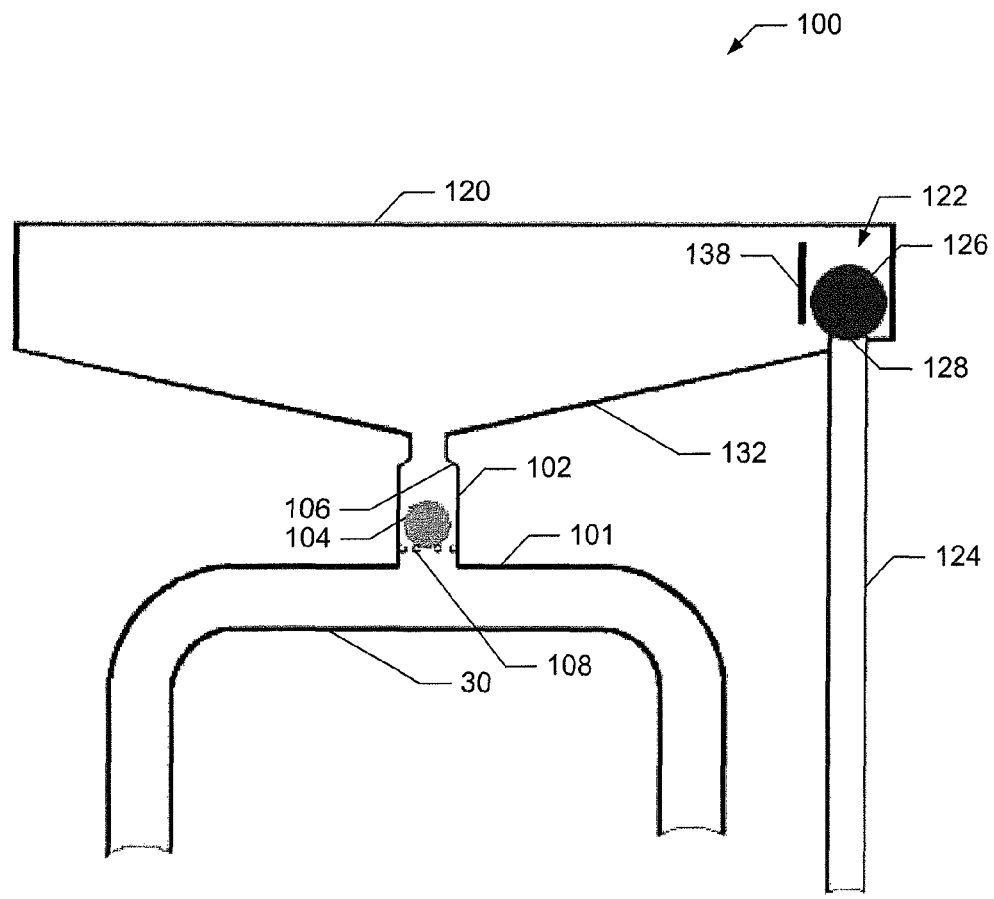
FIG. 2 illustrates a siphon break apparatus coupled to the drain hose of FIG. 1 in an initial empty configuration prior to draining soiled water according to an exemplary embodiment of the present invention.

In this regard, FIG. 2 illustrates an embodiment of the siphon break apparatus 100 connected to the drain hose 30. As described above, the drain hose 30 may define an inverted U-shape, and the siphon break apparatus 100 may be coupled to the drain hose at a top portion 101 of the inverted U-shape. FIG. 2 illustrates the drain hose 30 in an initial or empty configuration prior to draining fluid from the dishwasher 10. The siphon break apparatus 100 may comprise a check valve 102 (also hereinafter referred to as the "first check valve") that may couple to the drain hose 30 directly, or otherwise be in fluid communication therewith. Thus, the check valve 102 may be exposed to pressure within the drain hose 30 that fluctuates in response to fluid flowing through the drain hose. The check valve 102 may comprise various embodiments of one-way valves, such as swing, spring, or ball check valves that allow flow in one direction. In the illustrated embodiment, the check valve 102 comprises a ball 104 which, as will be described below, engages an upper sealing surface 106 when the check valve closes. When the check valve 102 is open, as illustrated in FIG. 2, the ball 104 may rest on a retaining element 108 such as a lip, screen, protrusion, or other structure configured to retain the ball 104 within the check valve while allowing flow through the check valve. Thus, as illustrated in FIG. 2, the check valve 102 may be biased or otherwise disposed in an initial substantially open position prior to draining fluid through the drain hose 30. The ball 104 may be guided upwardly by a guide wall (defined by the check valve perimeter) towards the upper sealing surface 106 as fluid enters the check valve 102 as explained below. As fluid exits the check valve 102 towards the drain hose 30, the ball 104 may be configured to travel downwardly until seated on the retaining element 108 as also explained below.

Figure 3:
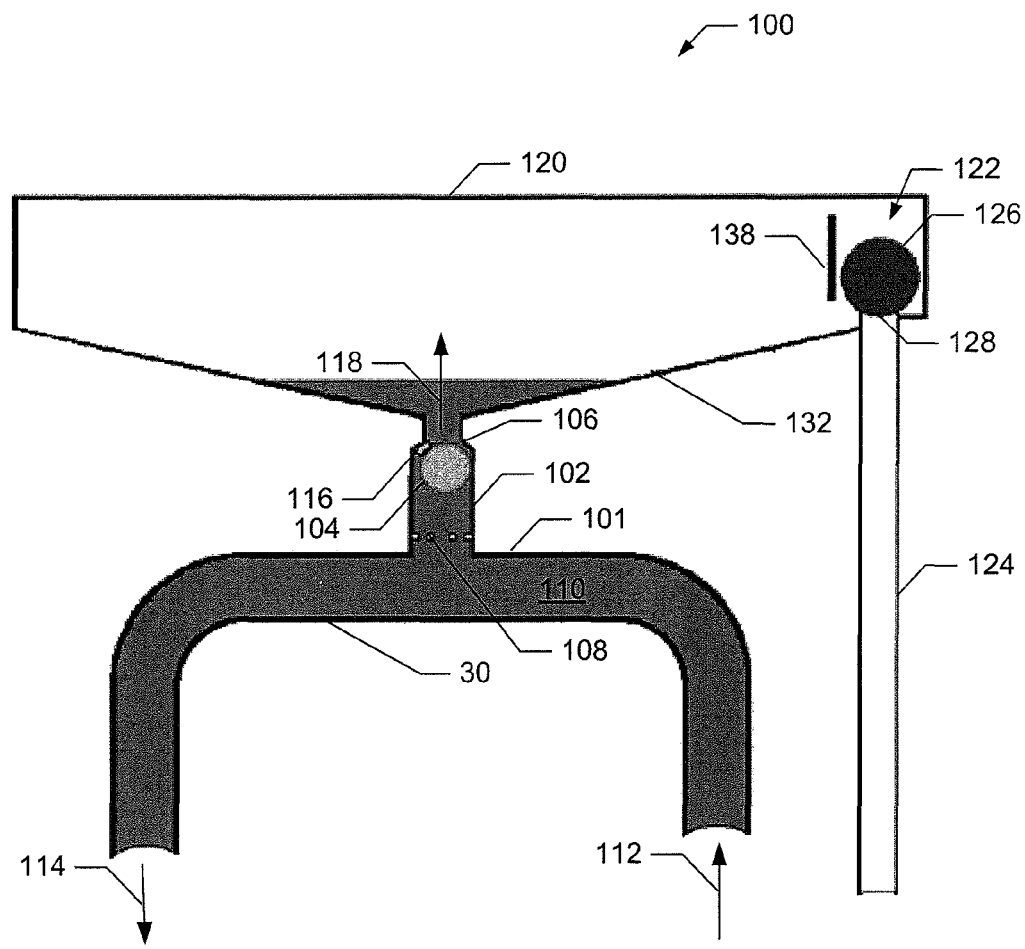
FIG. 3 illustrates the siphon break apparatus of FIG. 2 when soiled water is pumped through the drain hose and some of the soiled water enters a reservoir of the siphon break apparatus.

As illustrated in FIG. 3, the drain hose 30 may be configured to receive soiled water 110. For example, the soiled water 110 may travel into the drain hose 30 from the dishwasher 10 as indicated by the arrow 112, and out of the drain hose toward plumbing and the sewer system as indicated by the arrow 114. In one embodiment the soiled water 110 may travel in this manner as a result of the drain pump 26 pumping the soiled water out of the dishwasher 10.

In this regard, the check valve 102 may be configured to substantially close when the pressure in the drain hose 30 increases. For example, the pressure in the drain hose 30 may increase as a result of the soiled water 110 being pumped through the drain hose by the drain pump. For example, the check valve 102 may comprise a buoyant ball 104 configured to float in the soiled water 110 and seal against the upper sealing surface 106 of the check valve in the instance in which the pressure in the drain hose 30 increases as a result of the soiled water 110 being pumped therethrough.

However, in some instances soiled water 110 may leak out of the drain hose 30 through the check valve 102. For example, the check valve 102 may not close fast enough and/or the interface between the ball 104 and the sealing surface 106 may allow the soiled water 110 to escape between the ball and the sealing surface. Further, as illustrated in FIG. 3, foreign material 116 such as a piece of food removed from dishware may impede the seal or prevent motion of the check valve 102. Therefore, as indicated by the arrow 118, a portion of the soiled water 110 may travel through the check valve 102 even when the check valve is in a substantially closed configuration.

Accordingly, the siphon break apparatus 100 may further comprise a reservoir 120 configured to receive soiled water 110 that may escape from the drain hose 30 through the check valve 102. The reservoir 120 may comprise a substantially sealed container, as discussed below. In one embodiment the reservoir 120 may comprise a plastic material, although other materials may be employed as will be understood by one having skill in the art.

Figure 4:
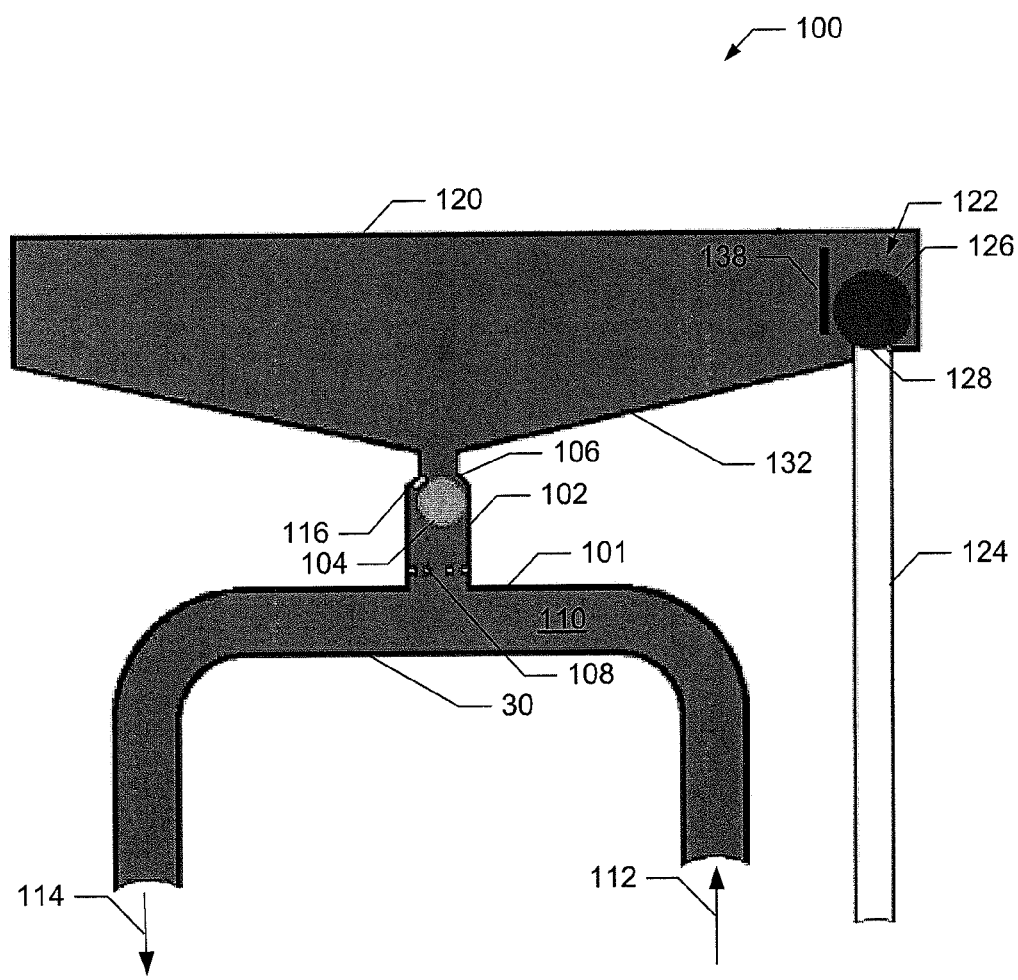
FIG. 4 illustrates the siphon break apparatus of FIG. 2 when soiled water has filled the reservoir.

As illustrated in FIG. 4, the reservoir 120 may eventually fill completely with the soiled water 110 depending on the size of the reservoir, the quantity of soiled water pumped from the washing chamber 12, and the size of the leak at the check valve 102. Accordingly, the siphon break apparatus 100 may further comprise a check valve 122 (hereinafter also referred to as the "second check valve") configured to substantially prevent the soiled water 110 in the reservoir 120 from exiting through a vent hose 124. Accordingly, the second check valve 122 may be in fluid communication with the first check valve 102 through the reservoir 120. The second check valve 122 may be coupled to the reservoir 120 or otherwise in fluid communication therewith. In one embodiment, the second check valve 122 is at least partially disposed inside the reservoir 120.

The second check valve 122 may comprise various embodiments of one-way valves, such as swing, spring, umbrella, or ball check valves. In the illustrated embodiment, the second check valve 122 comprises a ball 126 that engages a lower sealing surface 128 when the second check valve is closed. The second check valve 122 may be biased or otherwise disposed in a closed position before operating the drain pump as shown in FIG. 2. In addition, the second check valve 122 may be configured to be substantially closed when the pressure in the drain hose 30 increases as a result of the fluid being pumped through the drain hose. For example, the ball 126 may comprise a non-buoyant ball configured to seal against the lower sealing surface 128. Further, in one exemplary embodiment the ball 126 may comprise a glass marble ball, and the lower sealing surface 128 may comprise an elastomeric material. Accordingly, in embodiments in which the second check valve 122 is positioned inside the reservoir 120, the ball 126 may remain in contact with the lower sealing surface 128 when the soiled water 110 fills the reservoir.

Thus, the reservoir 120 may define a substantially fluid and airtight enclosure in an instance in which the second check valve 122 is closed. As such, any soiled water 110 that passes through the first check valve 102 may have to overcome pressure created by the soiled water entering the reservoir. Accordingly, the quantity of soiled water 110 entering the reservoir 120 may be reduced due to the resistance created by the pressure in the reservoir. Should any of the soiled water 110 escape through the second check valve 122, a vent hose (e.g., the vent hose 124) may be coupled to the second check valve and thereby configured to receive any of the soiled water that escapes through the second check valve. In some embodiments the dishwasher 10 may comprise a base tray, and the vent hose 124 may be configured to direct the soiled water 110 to the base tray where it may be captured.

In operation and as the soiled water 110 is pumped through the drain hose 30, the first check valve 102 may be substantially closed. However, any of the soiled fluid 110 that escapes through the first check valve 102 may be retained in the reservoir 120 and substantially impeded from exiting the reservoir through the vent hose 124 by the second check valve 122 as shown in FIG. 4. Thus, the siphon break apparatus 100 may be more resistant to fluid escaping the drain hose 30 than would an embodiment employing only a single check valve.

Figure 5:
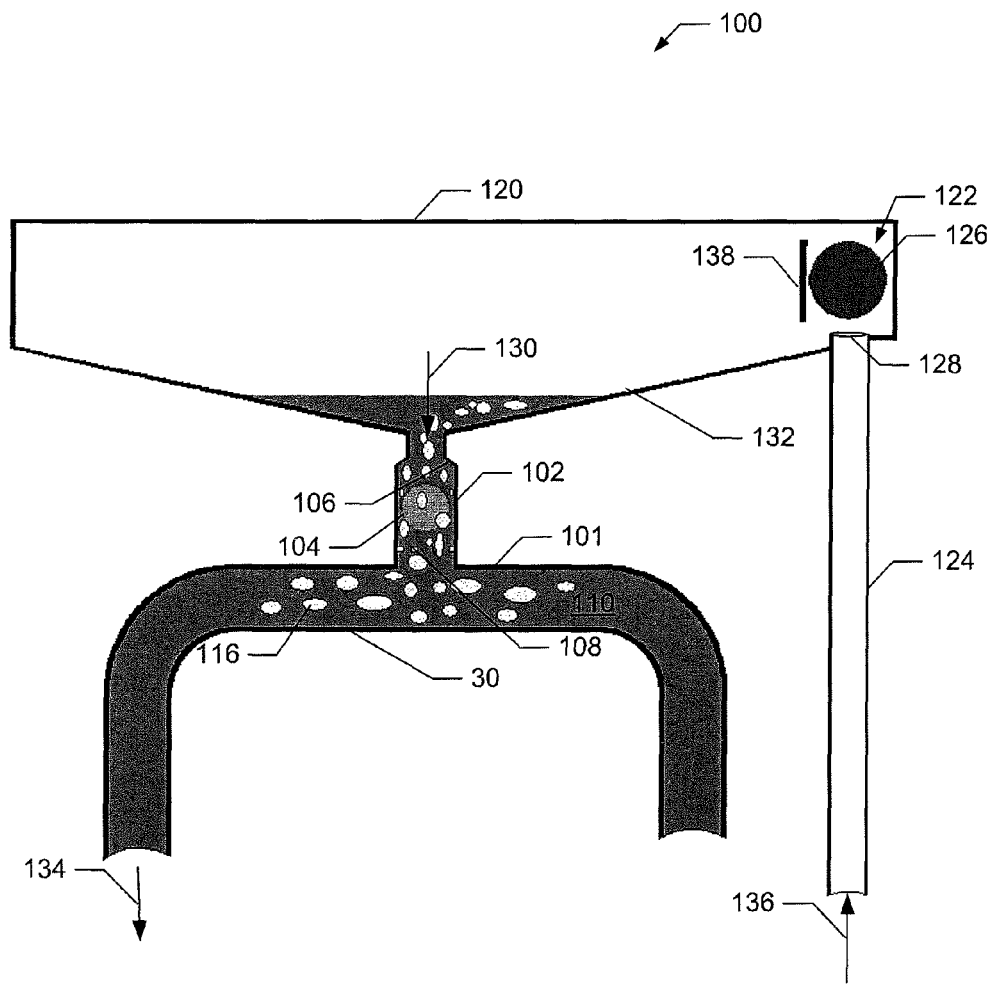
FIG. 5 illustrates the siphon break apparatus of FIG. 2 when the soiled water is no longer being pumped and the siphon break apparatus substantially prevents a siphon effect.

After the drain pump 26 stops pumping the soiled water 110, the siphon break apparatus 100 may be configured to substantially prevent the siphon effect in the drain hose 30. In this regard, as illustrated in FIG. 5, the first check valve 102 may be configured to be substantially open in the instance in which the pressure in the drain hose 30 decreases as a result of the soiled water no longer being pumped. Accordingly, any soiled water 110 that has accumulated in the reservoir 120 may drain through the first check valve 102 into the drain hose 30, as indicated by the arrow 130, under the influence of gravity. Further, the reservoir 120 may comprise a sloping bottom surface 132 that slopes toward the first check valve 102, which encourages the soiled water 110 to drain from the reservoir.

As indicated by the arrow 134, the soiled water 110 may continue draining from the drain hose 30 toward the plumbing and sewer system due to the momentum of the soiled water and the gravity acting on it. Hence the pressure inside the top portion 101 of the drain hose 30 and a reservoir pressure in the reservoir 120 may be relatively lower than the pressure in other parts of the drain hose as the soiled water 110 drains from the reservoir and the drain hose, thereby creating a vacuum effect or negative pressure as compared to an ambient pressure external to the drain hose and reservoir. Accordingly, the second check valve 122 may be configured to be substantially open when the reservoir pressure in the reservoir 120 decreases as a result of the soiled water 110 no longer being pumped through the fluid conduit. In particular, the ball 126 of the second check valve 122 may lift off of the lower sealing surface 128 as reservoir pressure in the reservoir 120 decreases and air enters the reservoir through the vent hose 124 as a result of a pressure differential, as indicated by the arrow 136. In order to keep the ball 126 within the second check valve 122, the second check valve may comprise a guide wall 138 configured to guide the ball as the valve opens and closes with respect to the sealing surface 128. For example, the guide wall may include a surface disposed within the reservoir that retains the ball while also allowing the ball to move in response to varying pressure within the reservoir, thereby relieving the siphon effect.

Figure 6:
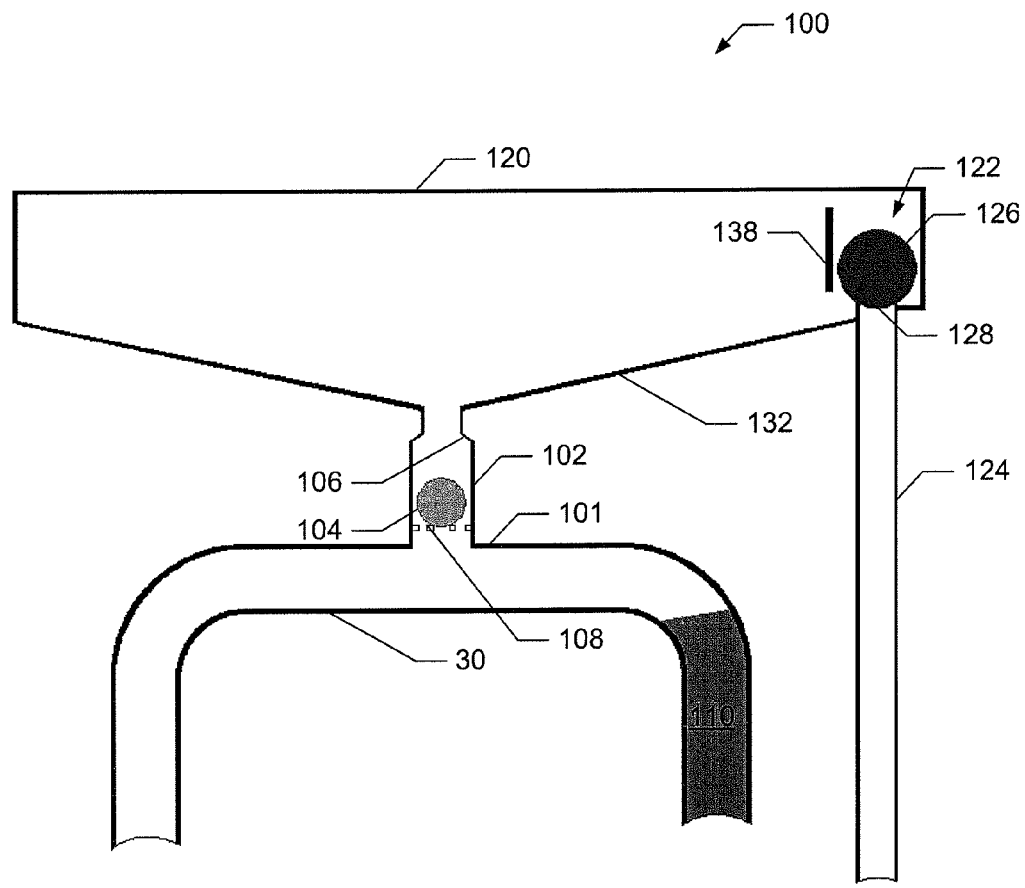
FIG. 6 illustrates the siphon break apparatus of FIG. 2 when the soiled water has drained from the drain hose.

Accordingly, the drain hose 30 may be exposed to ambient pressure (or other pressure in the vent hose 124) through the first check valve 102 and the second check valve 122 as the first check valve and the second check valve substantially open. Thus, exposure of the drain hose 30 to ambient pressure (or other pressure in the vent hose 124) may substantially prevent a low pressure from forming at the top portion 101 of the drain hose and, thus, substantially prevents the siphon effect that might otherwise pull water back into the dishwasher 10. As such, the siphon prevention apparatus 100 may return, as shown in FIG. 6, to the initial configuration whereby the first check valve 102 is open and the second check valve 122 is closed as the soiled water 110 finishes draining from the drain hose 30 and the pressure in the drain hose equalizes with ambient pressure (or other pressure in the vent hose 124).

Many modifications and other embodiments will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A siphon break apparatus configured to substantially prevent a siphon effect in a fluid conduit configured to drain a fluid, the siphon break apparatus comprising:
    a first check valve in fluid communication with the fluid conduit and exposed to a pressure therein that fluctuates in response to the fluid flowing through the fluid conduit; and
    a second check valve in fluid communication with the first check valve and exposed to a second pressure between the second check valve and the first check valve,
    wherein the first check valve is configured to be substantially closed when the pressure increases as a result of the fluid being pumped through the fluid conduit,
    wherein the first check valve is configured to be substantially open when the pressure decreases as a result of the fluid no longer being pumped through the fluid conduit,
    wherein the second check valve is configured to be substantially closed when the second pressure increases, and
    wherein the second check valve is configured to be in a closed position when no fluid is flowing through the fluid conduit.

2. The siphon break apparatus of claim 1, wherein the first check valve is configured to be in a substantially open position when no fluid is flowing through the fluid conduit.

3. The siphon break apparatus of claim 2, wherein the first check valve comprises a ball check valve.

4. The siphon break apparatus of claim 3, wherein the ball check valve comprises a buoyant ball configured to float in the fluid and seal against an upper sealing surface of the ball check valve when the fluid is pumped through the fluid conduit.

5. The siphon break apparatus of claim 1, wherein the second check valve comprises a ball check valve.

6. The siphon break apparatus of claim 5, wherein the ball check valve comprises a non-buoyant ball configured to seal against a lower sealing surface of the ball check valve when the fluid is pumped through the fluid conduit.

7. The siphon break apparatus of claim 6, wherein the non-buoyant ball comprises a glass marble ball, and
    wherein the lower sealing surface comprises an elastomeric material.

8. The siphon break apparatus of claim 6, wherein the ball check valve further comprises a guide wall configured to guide the non-buoyant ball with respect to the lower sealing surface when the ball check valve opens and closes.

9. The siphon break apparatus of claim 1, further comprising a reservoir configured to receive any of the fluid that escapes from the fluid conduit through the first check valve.

10. The siphon break apparatus of claim 9, wherein the second check valve is configured to open as a result of formation of a pressure differential between the second pressure in the reservoir and an atmospheric pressure external to the reservoir.

11. The siphon break apparatus of claim 9, wherein the second check valve is coupled to the reservoir.

12. The siphon break apparatus of claim 11, wherein the second check valve is at least partially disposed inside the reservoir.

13. The siphon break apparatus of claim 12, wherein the second check valve is disposed adjacent a bottom surface of the reservoir.

14. The siphon break apparatus of claim 9, wherein the reservoir defines a substantially airtight enclosure when the second check valve is closed.

15. The siphon break apparatus of claim 9, wherein the reservoir defines a sloping bottom surface that slopes toward the first check valve.

16. The siphon break apparatus of claim 9, wherein the reservoir is disposed between the first check valve and the second check valve.

17. A dishwasher, comprising:
    a washing chamber;
    a fluid supply configured to supply a fluid to the washing chamber;
    a drain pump configured to receive the fluid and pump the fluid through a fluid conduit configured to drain the fluid from the washing chamber; and
    a siphon break apparatus coupled to the fluid conduit and configured to substantially prevent a siphon effect in the fluid conduit, the siphon break apparatus comprising:
    a first check valve in fluid communication with the fluid conduit and exposed to a pressure therein; and
    a second check valve in fluid communication with the first check valve and exposed to a second pressure between the second check valve and the first check valve,
    wherein the first check valve is configured to be substantially closed when the pressure increases as a result of the fluid being pumped through the fluid conduit,
    wherein the first check valve is configured to be substantially open when the pressure decreases as a result of the fluid no longer being pumped through the fluid conduit, wherein the second check valve is configured to be substantially closed when the second pressure increases, and wherein the second check valve is configured to be in a closed position when no fluid is flowing through the fluid conduit.

18. The dishwasher of claim 17, further comprising a vent hose coupled to the second check valve and configured to receive any of the fluid that escapes through the second check valve.

19. The dishwasher of claim 18, further comprising a base tray configured to receive water directed thereto by the vent hose.

20. The dishwasher of claim 17, wherein the fluid conduit defines an inverted U-shape, and wherein the siphon break apparatus is coupled to the fluid conduit at a top portion of the inverted U-shape.

21. The dishwasher of claim 17, further comprising a reservoir configured to receive any of the fluid that escapes from the fluid conduit through the first check valve.

22. The dishwasher of claim 21, wherein the second check valve is configured to open as a result of formation of a pressure differential between a reservoir pressure in the reservoir and an atmospheric pressure external to the reservoir.

23. A method for assembling a dishwasher with a siphon break apparatus, comprising the steps of:

providing a dishwasher, comprising:
a washing chamber;
a fluid supply configured to supply a fluid to the washing chamber; and
a drain pump configured to receive the fluid and pump the fluid through a fluid conduit configured to drain the fluid from the washing chamber; and coupling a siphon break apparatus to the fluid conduit wherein the siphon break is configured to substantially prevent a siphon effect in the fluid conduit, the siphon break apparatus comprising:

a first check valve in fluid communication with the fluid conduit and exposed to a pressure therein; and a second check valve in fluid communication with the first check valve and exposed to a second pressure between the second check valve and the first check valve, wherein the first check valve is configured to be substantially closed when the pressure increases as a result of the fluid being pumped through the fluid conduit, wherein the first check valve is configured to be substantially open when the pressure decreases as a result of the fluid no longer being pumped through the fluid conduit, wherein the second check valve is configured to be substantially closed when the second pressure increases, and wherein the second check valve is configured to be in a closed position when no fluid is flowing through the fluid conduit.

24. The method of claim 23, further comprising the steps of configuring the fluid conduit to define an inverted U-shape, and coupling the siphon break apparatus to the fluid conduit at a top portion of the inverted U-shape.

* * * * *